(12) United States Patent
Jeon et al.

(10) Patent No.: US 10,108,047 B2
(45) Date of Patent: Oct. 23, 2018

(54) LIQUID CRYSTAL DISPLAY DEVICE

(71) Applicant: SAMSUNG DISPLAY CO., LTD., Yongin, Gyeonggi-do (KR)

(72) Inventors: Kyung Hwan Jeon, Hwaseong-si (KR); Beong Hun Beon, Hwaseong-si (KR); Sang Gu Lee, Hwanseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 517 days.

(21) Appl. No.: 14/737,113

(22) Filed: Jun. 11, 2015

(65) Prior Publication Data
US 2016/0231620 A1    Aug. 11, 2016

(30) Foreign Application Priority Data
Feb. 9, 2015 (KR) .................. 10-2015-0019405

(51) Int. Cl.
*G02F 1/1335* (2006.01)
*G02F 1/13363* (2006.01)
*G02B 5/30* (2006.01)

(52) U.S. Cl.
CPC ..... *G02F 1/133634* (2013.01); *G02B 5/3041* (2013.01); *G02F 1/133536* (2013.01)

(58) Field of Classification Search
CPC ................................. G02F 1/133536
USPC ............................................. 349/96
See application file for complete search history.

(56) References Cited

U.S. PATENT DOCUMENTS

| 8,035,774 B2* | 10/2011 | Ouderkirk | G02B 5/305 349/96 |
| 2010/0157195 A1* | 6/2010 | Miyatake | G02B 5/3033 349/62 |
| 2012/0140324 A1 | 6/2012 | Weber et al. | |
| 2013/0088783 A1 | 4/2013 | Liu et al. | |
| 2013/0342793 A1* | 12/2013 | Takeda | G02F 1/133634 349/96 |

FOREIGN PATENT DOCUMENTS

| KR | 1020130036918 | 4/2013 |
| KR | 1020140065704 | 5/2014 |
| KR | 1020140089678 | 7/2014 |

* cited by examiner

*Primary Examiner* — Thanh-Nhan P Nguyen
(74) *Attorney, Agent, or Firm* — F. Chau & Associates, L.L.C.

(57) ABSTRACT

A liquid crystal display comprises a surface light source, a lower polarizing plate disposed on the surface light source, a liquid crystal layer disposed on the lower polarizing plate, a retardation layer disposed on the liquid crystal layer and an upper polarizing plate disposed on the retardation layer, wherein the lower polarizing plate is a reflective polarizing plate exhibiting positive C phase difference characteristics, and the retardation layer exhibits positive A phase difference characteristics.

17 Claims, 8 Drawing Sheets

LIQUID CRYSTAL DISPLAY DEVICE

LIQUID CRYSTAL DISPLAY DEVICE

This application claims priority under 35 U.S.C. § 119 from Korean Patent Application No. 10-2015-0019405 filed on Feb. 9, 2015 in the Korean Intellectual Property Office, and all the benefits accruing therefrom, the contents of which are herein incorporated by reference in their entirety.

BACKGROUND

1. Technical Field

Embodiments of the present disclosure are directed to a crystal display device, and, more particularly, to a liquid crystal display device providing a wide viewing angle.

2. Discussion of the Related Art

Liquid crystal displays (LCD) are widely used as a general image display device. However, despite many excellent characteristics, liquid crystal displays have a narrow viewing angle.

In the early development of liquid crystal displays, a distorted image was displayed on an inclined plane, not a front plane, but, currently, it is possible to display a reasonably high-quality image on an inclined plane due to the application of a retardation film. Moreover, with the development of a transverse electric field driving technology, there are now liquid crystal display modes that can display at a wide viewing angle even when no retardation film is used, and thus by combining a retardation film with the liquid crystal display mode, a high-quality image can been realized that is clearly superior to the early-developed liquid crystal displays.

In addition, attempts to further increase the brightness of liquid crystal display have been studied. For this purpose, a brightness enhancing film such as a reflective polarizing plate is used with liquid crystal display.

However, a conventional liquid crystal display device cannot realize a complete black state, in which no light leakage occurs, without considering wavelength dispersion because the phase differences of optical elements used in liquid crystal display change according to wavelength. Further, when a large-sized liquid crystal display device is used, image quality can deteriorate, and thus spots may appear in an image.

Moreover, when a reflective polarizing plate is used with a liquid crystal display to enhance brightness, different phase characteristics can be expressed, and thus a retardation film of a liquid crystal display should be re-designed for the liquid crystal display to have the desired phase characteristics.

SUMMARY

Embodiments of the present disclosure can provide a traverse electric field drive mode liquid crystal display device that can provide a wide viewing angle with improved brightness due to the application of a reflective polarizing plate.

However, embodiments of the present disclosure are not restricted to the one set forth herein. The above and other features of the present disclosure will become more apparent to one of ordinary skill in the art to which the present disclosure pertains by referencing the detailed description of the present disclosure given below.

According to an embodiment of the present disclosure, there is provided a liquid crystal display device, comprising: a surface light source; a lower polarizing plate disposed on the surface light source; a liquid crystal layer disposed on the lower polarizing plate; a retardation layer disposed on the liquid crystal layer; and an upper polarizing plate disposed on the retardation layer, wherein the lower polarizing plate is a reflective polarizing plate exhibiting positive C phase difference characteristics, and the retardation layer exhibits positive A phase difference characteristics.

According to another embodiment of the present disclosure, there is provided a lower polarizing plate that received light; a retardation layer disposed on lower polarizing plate; and an upper polarizing plate disposed on the retardation layer, wherein the lower polarizing plate comprises at least one reflective polarizing laminate and at least one buffer layer, and wherein the lower polarizing plate is a reflective polarizing plate exhibiting positive C phase difference characteristics, and the retardation layer exhibits positive A phase difference characteristics.

DETAILED DESCRIPTION OF EXEMPLARY EMBODIMENTS

Embodiments of the present disclosure will now be described more fully hereinafter with reference to the accompanying drawings, in which exemplary embodiments of the disclosure are shown. This disclosure may, however, be embodied in different forms and should not be construed as limited to the embodiments set forth herein. The same reference numbers may indicate the same components throughout the specification. In the attached figures, the thickness of layers and regions may be exaggerated for clarity.

It will be understood that when an element or layer is referred to as being "connected to," or "coupled to" another element or layer, it can be directly connected to or coupled to another element or layer or intervening elements or layers may be present. Like numbers may refer to like elements throughout. Herein, when two or more elements are described as being about the same as each other, it is to be understood that the elements are identical to each other, indistinguishable from each other, or distinguishable from each other but functionally the same as each other as would be understood by a person having ordinary skill in the art.

Hereinafter, exemplary embodiments of the present disclosure will be described in detail with reference to the accompanying drawings.

Figure 1:
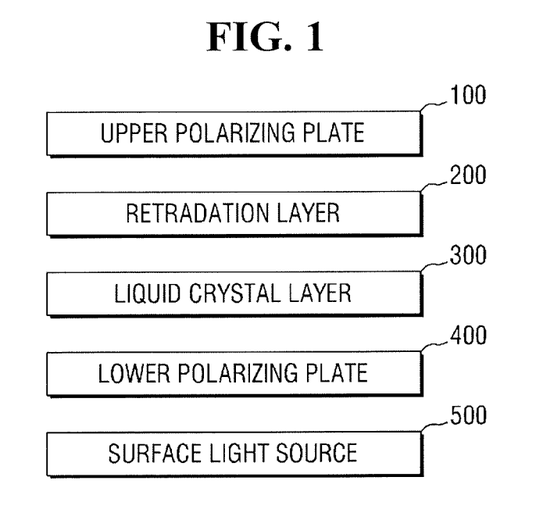
FIG. 1 is an exemplary view of an arrangement of a liquid crystal display device according to an embodiment of the present disclosure.

FIG. 1 illustrates the arrangement of a liquid crystal display device according to an embodiment of the present disclosure.

Referring to FIG. 1, a liquid crystal display device according to an embodiment of the present disclosure includes a surface light source 500, a lower polarizing plate 400 disposed on the surface light source 500, a liquid crystal layer 300 disposed on the lower polarizing plate 400, a retardation layer 300 disposed on the liquid crystal layer 300, and an upper polarizing plate 100 disposed on the retardation layer 200.

In an embodiment of the present disclosure, the surface light source 500 is referred to as a backlight unit, and may be a light source that provides white light for displaying an image in the liquid crystal display device. According to an embodiment, the surface light source 500 may be an edge type light source that includes a light guide plate and a reflective plate, and may also be a direct-type light source that includes a plurality of LEDs distributed on the surface and a diffusion plate. In addition, the surface light source 500 may include at least one optical film, such as a prism sheet or a diffusion sheet, to improve the optical characteristics of emitted light.

The lower polarizing plate 400 is disposed on the surface light source, and can receive white light from the surface light source 500. White light provided to the lower polarizing plate may be combinations of linearly polarized light, elliptically polarized light and circularly polarized light, and the superposition of the mixed light will be generally analyzed as elliptically polarized light.

In an embodiment of the present disclosure, the lower polarizing plate 400 may be a reflective polarizing plate. That is, the lower polarizing plate 400 can transmit components parallel to the transmission axis of the light received from the surface light source 500, and can reflect components perpendicular to the transmission axis of the light received from the surface light source 500. In this case, reflected light is incident again to the surface light source 500, and is reflected by a reflective layer, such as reflective film, included in the surface light source 500, so as to be recycled.

Hereinafter, the lower polarizing plate 400, which is a reflective polarizing plate, will be described in more detail with reference to FIG. 2.

Figure 2:
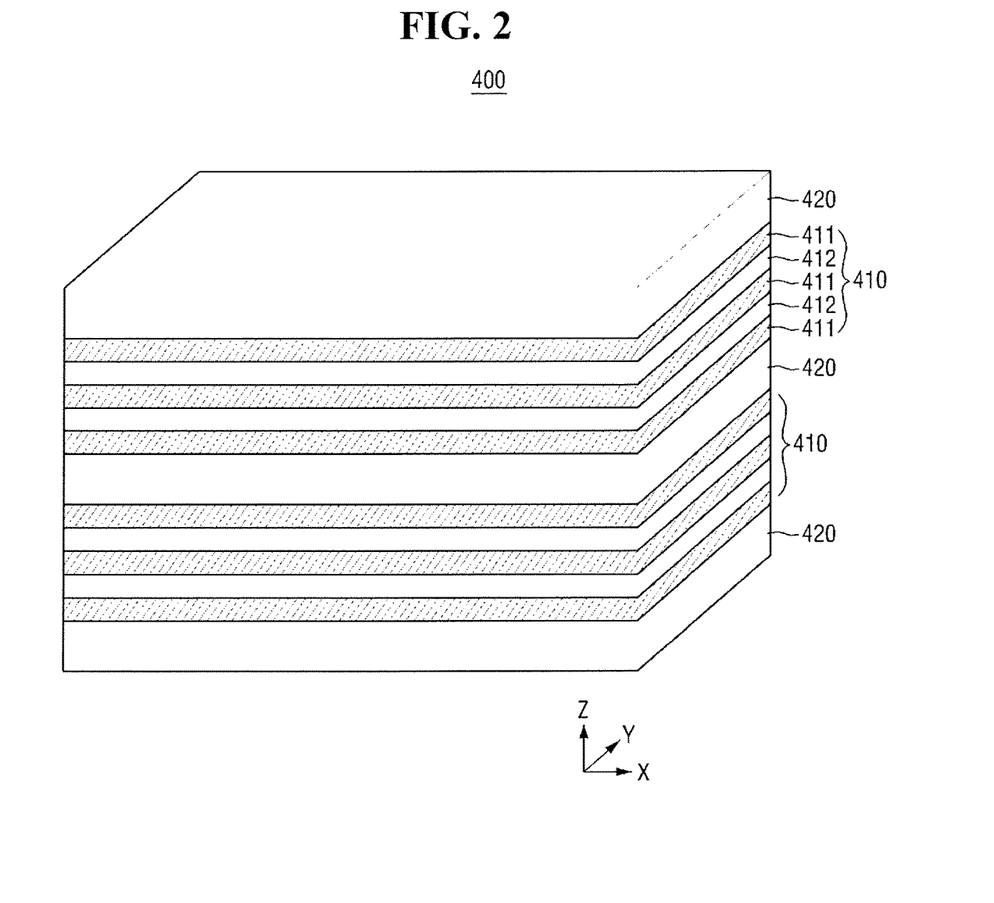
FIG. 2 is a perspective view of a lower polarizing plate of the liquid crystal display device according to an embodiment of the present disclosure.

FIG. 2 is a perspective view of the lower polarizing plate 400 of a liquid crystal display device according to an embodiment of the present disclosure.

In an embodiment of the present disclosure, the lower polarizing plate 400 may be a reflective polarizing plate.

More specifically, the lower polarizing plate 400 may be a reflective polarizing plate that includes at least one reflective polarizing laminate 410 and at least one buffer layer 420.

The reflective polarizing laminate 410 may be a repetitive laminate structure in which two or more layers 411, 412 having different refractive indices are repeatedly disposed. More specifically, the reflective polarizing laminate may have a structure in which first reflective polarizing layers 411 and second reflective polarizing layers 412 are repeatedly laminated. Each first reflective polarizing layer 411 has a first direction (X direction) refractive index and a different second direction (Y direction) refractive index, and each second reflective polarizing layer 412 has first direction (X direction) and second direction (Y direction) refractive indices that are the same as the first direction (X direction) refractive index of the first reflective polarizing layer and different from the second direction (Y direction) refractive index of the first reflective polarizing layer.

Thus, light entering the lower polarizing plate 400 having components parallel to the first direction (X direction) and propagating through the reflective polarizing laminate 410, will not be affected by changes in the refractive index between the first reflective polarizing layer 411 and the second reflective polarizing layer 412, and thus these components will propagate through the reflective polarizing laminate 410. In addition, light entering the lower polarizing plate 400 having components parallel to the second direction (Y direction) and propagating through the reflective polarizing laminate 410, will be effected by changes in refractive index between the first reflective polarizing layer 411 and the second reflective polarizing layer 412, and thus Fresnel reflection will occur in which a portion of light is transmitted and another portion of light is reflected.

The total proportion of reflected light can be increased by increasing the number of the reflective polarizing laminates 410 included in the lower polarizing plate 400, or the number of the first and second reflective polarizing layers 411, 412 included in the reflective polarizing laminate 410, and light propagating through the lower polarizing plate 400 may be linearly polarized light that oscillates in a direction substantially parallel to the first direction (X direction).

The light reflected from the lower polarizing plate 400, which is a reflective polarizing plate, is incident to a backlight unit, and then scattered and reflected to be incident again to the lower polarizing plate 400, so as to be recycled.

A buffer layer 420 may be disposed outside the reflective polarizing plate or between the two reflective polarizing laminates 410. The buffer layer 420 may include a material constituting the second reflective layer and having the same in-plane refractive indices. The buffer layer 420 serves to protect, support and connected one or more reflective polarizing laminates with each other.

In the above description of the structure and polarization principle of a reflective polarizing plate according to an exemplary embodiment, the reflective polarizing laminate 410 has been described as including first reflective polarizing layers 411 having different in-plane refractive indices and second reflective polarizing layers 412 having the same in-plane refractive indices. However, in other embodiments of the present disclosure, the reflective polarizing plate may have refractive index deviation in a direction (Z direction) perpendicular to the plane, or in a thickness direction, and thus the lower polarizing plate may have a phase difference in a thickness direction.

That is, in an embodiment of the present disclosure, when the refractive indices in a direction (Z direction) perpendicular to the plane of the lower polarizing plate and the refractive indices in directions (X direction or Y direction) parallel to the plane thereof are adjusted, a reflective polarizing plate can acquire phase difference characteristics in a thickness direction, and linearly polarized light propagating through the reflective polarizing plate may acquire a phase difference that corresponds to the phase difference characteristics in the thickness direction.

In an embodiment of the present disclosure, the lower polarizing plate 400, which is a reflective polarizing plate, exhibits positive C phase difference characteristics. In addition, refractive indices of the lower polarizing plate satisfy the relationship of Nz>Nx=Ny, where, Nz is a refractive index in a thickness direction, and Nx and Ny are refractive indices in planar directions perpendicular to each other. Further, the phase difference (Rth) of the lower polarizing plate in a thickness direction may be from about 40 nm to about 120 nm, and, more specifically, the thickness direction phase difference (Rth) may be about 80 nm.

The definition of phase difference characteristics and detailed description of positive C phase difference characteristics will be described in conjunction with a description of a retardation layer to be described with reference to FIGS. 3 and 4.

Referring to FIG. 1 again, a liquid crystal layer 300 is disposed on the lower polarizing plate 400.

In an embodiment of the present disclosure, the liquid crystal layer 300 may operate in a traverse electric field drive mode. In this case, the traverse electric field drive mode may be an in-plane switching (IPS) mode, a fringe field switching (FFS) mode, or a plane to line switching (PLS) mode.

In addition, in a traverse electric field drive mode, the liquid crystal layer may be disposed between two substrates facing each other, and may contain a liquid crystal material that align according to an electric filed applied perpendicular to the substrates and rotates in the plane.

Further, at least one of the two substrates facing each other may include a common electrode and a pixel electrode for applying a traverse electric field to the liquid crystal layer.

A retardation layer 200 may be disposed on the liquid crystal layer 300, and an upper polarizing plate 100 may be disposed on the retardation layer 200. For reference, in an embodiment of the present disclosure, "on" and "beneath" are determined based on a direction in which light is emitted from a light source. More specifically, when a layer is located in a direction away from the surface light source, this layer is located "on" another layer, and when a layer is located in direction approaching the surface light source, this layer is located "beneath" another layer.

The retardation layer 200 compensates for phase differences of light propagating through the liquid crystal layer 300 toward the upper polarizing plate 100, and compensates for phase difference caused by optical films or layers used in the liquid crystal display device, thus providing compensated light to the upper polarizing plate 100. The upper polarizing plate 100 transmits components of light received from the retardation layer 200 that are parallel to the transmission axis, and absorbs the components of light received from the retardation layer 200 that are perpendicular to the transmission axis.

The retardation layer 200 and the upper polarizing plate 100 will be described in more detail with reference to FIGS. 3 and 4.

Figure 3:
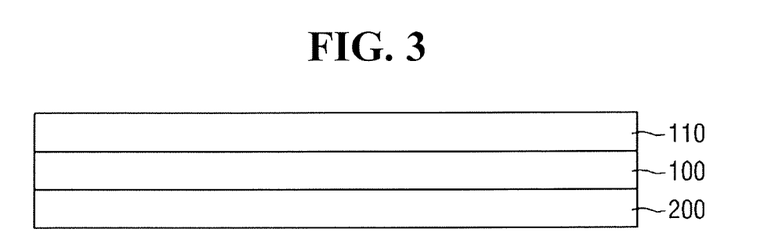
FIG. 3 is a cross-sectional view of a laminated structure of an upper polarizing plate and a retardation layer in a liquid crystal display device according to an embodiment of the present disclosure.

FIG. 3 is a cross-sectional view of the laminated structure of the retardation layer and the upper polarizing layer in a liquid crystal display device according to an embodiment of the present disclosure.

Figure 4:
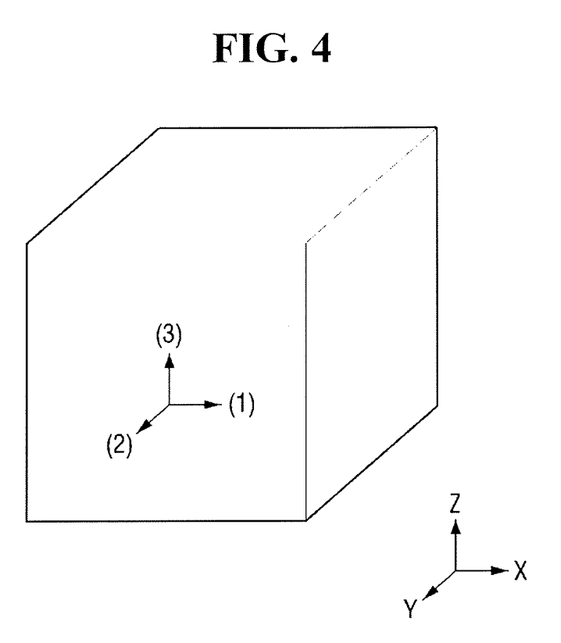
FIG. 4 illustrates the refractive index of a retardation layer.

FIG. 4 illustrates the refractive index of the retardation layer.

Referring to FIG. 3, the upper polarizing plate 100 may be disposed on the retardation layer 200, and a protective layer 110 may be disposed on the upper polarizing plate. The protective layer may be made of triacetyl cellulose (TAC).

The retardation layer 200 may exhibit normal wavelength dispersion with respect to all front phase difference values and flat dispersion with respect to negative refractive indices in which Nz is a negative integer, and exhibits positive A phase difference characteristics.

In addition, refractive indices of the retardation layer 200 satisfy the relationship of Nx>Ny=Nz, where Nz is a refractive index in the thickness direction, and Nx and Ny are refractive indices in planar directions perpendicular to each other. Further, the in-plane phase difference (Ro) of the upper polarizing plate 100 may be from about 20 nm to about 160 nm, and the thickness direction phase difference (Rth) of the upper polarizing plate 100 may be from about 10 nm to about 80 nm. More specifically, the in-plane phase difference (Ro) thereof may be 54 nm, and the thickness direction phase difference (Rth) may be about 27 nm.

In an embodiment of the present disclosure, "wavelength dispersion" refers to differences between the refractive index (Nz) or front phase difference (Ro) in a wavelength range of about 380 nm to about 780 nm with respect to the refractive index (Nz) or front phase difference (Ro) at a reference wavelength. That is, the differences between the refractive index (Nz) in a wavelength range of about 380 nm to about 780 nm with respect to the refractive index (Nz) at a reference wavelength is referred to as "wavelength dispersion of refractive index (Nz)", and differences between the front phase difference (Ro) in a wavelength range of about 380 nm to about 780 nm with respect to the front phase difference (Ro) at a reference wavelength is referred to as "wavelength dispersion of front phase difference (Ro)".

Wavelength dispersion includes normal dispersion in which the refractive index (Nz) or the front phase difference (Ro) decreases with increasing wavelength, and inverse dispersion in which the refractive index (Nz) or the front phase difference (Ro) increases with increasing wavelength. Wave dispersion in which the refractive index (Nz) or the front phase difference (Ro) does not change as a function of wavelength is referred to as "flat dispersion".

"Wavelength dispersion" can be expressed as the rate of change (gradient) of the refractive index (Nz) or front phase difference (Ro) between two points or three points of incident wavelength band after measuring the refractive index (Nz) or front phase difference (Ro) at an incident wavelength of 380 nm to 780 nm. Therefore, when the reference wavelength is set to about 590 nm, wavelength dispersion of the front phase difference (Ro) of the retardation layer may represented as the ratio (Ro(380 nm)/Ro(590 nm)) of the front phase difference (Ro) at an incident wavelength of about 380 nm to the front phase difference (Ro) at an incident wavelength of about 590 nm.

The optical characteristics of the retardation film or layer 200 used to control the phase difference of a liquid crystal display device according to an embodiment of the present disclosure are defined by Equations 1 to 3 below.

In general, the optical characteristics of a retardation film, unless otherwise specified, refer to the optical characteristics of a retardation film at a wavelength of 590 nm, which can be easily obtained from a light source. This optical characteristic of the retardation film is a refractive index. FIG. 4 illustrates the refractive index of the retardation layer 200. In FIG. 4, Nx represents the greatest refractive index on the plane, Ny represents the refractive index in a direction perpendicular to Nx on the plane, and Nz represents the refractive index in a thickness direction normal to the plane.

$$Rth = [(Nx+Ny)/2 - Nz] \cdot d \qquad \text{[Equation 1]}$$

Here, each of Nx and Ny is an in-plane refractive index, Nx≥Ny, Nz is a thickness direction refractive index, and d represents thickness.

$$Ro = (Nx - Ny) \cdot d \qquad \text{[Equation 2]}$$

Here, each of Nx and Ny is an in-plane refractive index, Nx≥Ny, and d represents thickness.

$$NZ=(Nx-Nz)/(Nx-Ny)=Rth/Ro+0.5 \quad \text{[Equation 3]}$$

Here, each of Nx and Ny is an in-plane refractive index, Nx≥Ny, and Nz represents a thickness direction refractive index of a film.

Rth of Equation 1 above is a phase difference value in a thickness direction that represents the difference between the in-plane refractive index and the thickness direction refractive index, and Ro of Equation 2 above is a front phase difference value which is a substantial phase difference occurring when light passes through a film in a direction normal to the film.

Further, NZ of Equation 3 above is a refractive index ratio, and the plates used as a retardation film can be classified according to NZ.

There may be at least 3 cases to be considered: (1) a case in which an optical axis having a phase difference is located in an upward direction of the plane of a film, referred to A plate; (2) a case in which an optical axis having a phase difference is located in a direction perpendicular to the plane of a film, referred to as B plate; and (3) a case in which there exist two optical axes having a phase difference, referred to as a biaxial plate.

More specifically: case (1) in which NZ is 1 and the relationship Nx>Ny=Nz between the refractive indices is satisfied is referred to as a "positive A plate"; case (2) in which 1<NZ and the relationship Nx>Ny>Nz between the refractive indices is satisfied is referred to as "negative biaxial A plate"; case (3) in which 0<NZ<1 and the relationship Nx>Nz>Ny between the refractive indices is satisfied is referred to as "Z-axis oriented film"; case (4) in which NZ=0 and the relationship Nx=Nz>Ny between the refractive indices is satisfied is referred to as "negative A plate"; case (5) in which NZ<0 and the relationship Nz>Nx>Ny between the refractive indices is satisfied is referred to as "positive biaxial A plate"; case (6) in which NZ=∞ and the relationship Nz>Nx=Ny between the refractive indices is satisfied is referred to as "negative C plate", and case (7) in which NZ=∞ and the relationship Nz<Nx=Ny between the refractive indices is satisfied is referred to as "positive C plate".

In an embodiment of the present disclosure, the retardation layer 200 has positive A plate characteristics approaching Nz=1 because it satisfies the relationship Nx>Ny=Nz.

Further, in an embodiment of the present disclosure, the lower polarizing plate 400 has positive C plate characteristics because it satisfies the relationship NZ>Nx=Ny. However, in this case, the fact that the lower polarizing plate 400 is a reflective polarizing plate should be considered. In a reflective polarizing plate, the in-plane refractive indices Nx and Ny may differ from each other. Nevertheless, since transmitted light having a phase difference is being reflected by the reflective polarizing plate to be transmitted parallel to the transmission axis of the reflective polarizing plate, it is assumed that no difference in the in-plane refractive indices of the reflective polarizing plate exists, that is, Nx=Ny. However, in linearly polarized light that has passed through a reflective polarizing plate, the difference between the in-plane refractive indices and the thickness direction refractive index can be recognized. A reflective polarizing plate may be configured to have phase difference characteristics of a positive C plate by adjusting the refractive index characteristics and material and thickness of each of the layers of the reflective polarizing plate.

The retardation layer 200 may be a stretched retardation layer.

The retardation film or layer 200 has a phase difference through stretching. Here, a film whose refractive index increases in a stretching direction has "positive (+) refractive index characteristics", and a film whose refractive index decreases in a stretching direction has "negative (−) refractive index characteristic. A material for a retardation film having positive (+) refractive index characteristics may be selected from a group consisting essentially of triacetyl cellulose (TAC), cycloolefin polymer (COP), a cycloolefin copolymer (COC), polyethylene terephthalate (PET), polypropylene (PP), polycarbonate (PC), polysulfone (PSF), and polymethyl methacrylate (PMMA). A retardation film having negative (−) refractive index characteristics may be made of modified polystyrene (PS) or modified polycarbonate (PC).

A stretching method may be classified into fixed-end stretching and free-end stretching. Fixed-end stretching involves stretching a film while fixing the length of the film in directions other than a stretching direction, and free-end stretching involves stretching a film while freeing the film in directions other than a stretching direction.

In general, a film contracts in directions other than a stretching direction while being stretched, whereas a Z-axis oriented film uses an addition contracting process in addition to a stretching process. During a stretching process, a direction in which a rolled film is unrolled is referred to as a machine direction (MD), and a direction perpendicular to the machine direction is referred to as a transverse direction (TD). The fixed-end stretching stretches a film in a machine direction (MD), and the free-end stretching stretches a film in a traverse direction (TD).

The Nz and plates may change according to such a stretching method, when only a primary process is applied, and are summarized as follows: (1) a positive A plate may be fabricated by free-end-stretching a film having positive (+) refractive index characteristics; (2) a negative biaxial A plate may be fabricated by fixed-end-stretching a film having positive (+) refractive index characteristics; (3) a Z-axis oriented film may be fabricated by free-end-stretching a film having positive (+) refractive index characteristics or negative (−) refractive index characteristics and then fixed-end-contracting the film; (4) a negative A plate may be fabricated by free-end-stretching a film having negative (−) refractive index characteristics; and (5) a positive biaxial A plate may be fabricated by fixed-end-stretching a film having negative (−) refractive index characteristics.

In addition to the above, a retardation film can control optical characteristics, such as a phase difference and Nz, in a slow axis direction by the application of additional processes such as secondary stretching, and by applying additives. These additional processes are generally used in related fields, and are not limited.

The retardation layer 200 may be another layer or film, such as a coating layer formed on the upper polarizing plate 100. That is, when the upper polarizing plate 100 is a film, the retardation layer 200 may be a coating layer formed on the film as a substrate.

The coating layer may be composed of materials known to provide a phase difference, such as reactive liquid crystal monomers such as reactive mesogens. In an embodiment of the present disclosure, a reactive liquid crystal monomer, which is a liquid crystal material that includes a polymerizable terminal group, refers to a monomer molecule that includes a terminal group polymerizable with a mesogen that exhibits liquid crystallinity to form a liquid crystal phase, and is not limited to reactive mesogens having a specific structure.

For example, reactive mesogen may have a structure in which a photopolymerization reaction is caused by a free radical formed in a (meth)acrylate group located at a terminal thereof. The photopolymerization reaction is useful when the free radical of the terminal of the reactive mesogen is stabilized and thus maintained. When the core portion of a reactive mesogen has a planar structure, a structure in which adjacent reactive mesogens are relatively easily laminated can be formed. Thus, pi-pi interaction occurs between phenyl rings of the reactive mesogen, increasing resonance, and more photocuring reactions may occur.

A reactive liquid crystal monomer may be included in a coating composition in an amount of about 0.1 wt % to about 5 wt %.

A coating composition of a coating layer may include an initiator in addition to a reactive liquid crystal monomer. The initiator can be used to accelerate the curing reaction of the reactive mesogen (RM). The initiator is decomposed into radicals by absorbing UV light in a wavelength range of about 300 nm to about 400 nm, thereby accelerating the photopolymerization reaction attributable to UV light. When a coating composition includes an initiator, short-wavelength UV light that may be fatal to other organic materials need not be used because long-wavelength UV light is used. The initiator may be included in an amount of about 0.1 wt % to about 5 wt % based on the total amount of the reactive liquid crystal monomer.

In an embodiment of the present disclosure, the retardation layer 200 has normal wavelength dispersion with respect to all front phase difference (Ro) values, and exhibits flat dispersion with respect to a negative refractive index (Nz). These will be described below with reference to Equations 4 to 6.

Equations 4 to 6 below represent wavelength dispersion of the retardation film 200. The respective Equations include a relationship (Equation 4) of an incident wavelength and a refractive index ratio (Nz), a relationship (Equation 5) of an incident wavelength and a front phase difference value (Ro), and a relationship (Equation 6) of an incident wavelength and a thickness direction phase difference value (Rth).

In this case, the incident wavelength ($\lambda$) is from about 380 nm to about 780 nm, and $\lambda 0=590$ nm. In Equations 4 to 6, a, b, and c are respectively defined as 1 in the case of $NZ(\lambda)/NZ(\lambda 0)=\lambda/\lambda 0$, $Ro(\lambda)/Ro(\lambda 0)=\lambda/\lambda 0$, and $Rth(\lambda)/Rth(\lambda 0)=\lambda/\lambda 0$. The above definition represents inverse wavelength dispersion of the retardation film, which completely compensates the normal wavelength dispersion of liquid crystals.

In Equations 4 to 6, each of a, b, and c respectively represent the value of a incident wavelength based on the case of $NZ(\lambda)/NZ(\lambda 0)=\lambda/\lambda 0$, $Ro(\lambda)/Ro(\lambda 0)=\lambda/\lambda 0$, and $Rth(\lambda)/Rth(\lambda 0)=\lambda/\lambda 0$ at $\lambda 0=590$ nm. Thus, the wavelength dispersion of the retardation layer may be expressed by the values of a, b, and c.

$$NZ(\lambda) = NZ(\lambda 0)\left\{c \times \left(\frac{\lambda - \lambda 0}{\lambda 0}\right) + 1\right\} \quad \text{[Equation 4]}$$

In Equation 4, $\lambda$, is an incident wavelength of about 380 nm to about 780 nm, and $\lambda 0$ is a reference wavelength of about 590 nm. Here, if c=1, $[NZ(\lambda)/NZ(590)]=[\lambda/590]$.

Equation 4 may be rewritten as a linear equation $NZ(\lambda)/NZ(\lambda 0)=c[(\lambda-\lambda 0)/\lambda O]+1$, and may be represented by ratios $NZ(\lambda)/NZ(\lambda 0)=Y$ and $(\lambda-\lambda 0)/\lambda 0=X$. Specifically, c represents a gradient obtained from the relation of Y, the ratio of the refractive index [$NZ(\lambda)$] of the incident wavelength to the refractive index [$NZ(\lambda 0)$] of the reference wavelength, and X, the ratio of the difference [$(\lambda-\lambda 0)$] between the incident wavelength and the reference wavelength to the reference wavelength [$\lambda 0$]. Similarly, each of a and b also represents a gradient.

$$Ro(\lambda) = Ro(\lambda 0)\left\{a \times \left(\frac{\lambda - \lambda 0}{\lambda 0}\right) + 1\right\} \quad \text{[Equation 5]}$$

In Equation 5, $\lambda$ is an incident wavelength of about n380 nm to about 780 nm, and $\lambda 0$ is a reference wavelength of about 590 nm. Here, if a=1, $[Ro(\lambda)/Ro(590)]=[\lambda/590]$.

$$Rth(\lambda) = Rth(\lambda 0)\left\{b \times \left(\frac{\lambda - \lambda 0}{\lambda 0}\right) + 1\right\} \quad \text{[Equation 6]}$$

In Equation 6, $\lambda$ is an incident wavelength of about 380 nm to about 780 nm, and $\lambda 0$ is a reference wavelength of about 590 nm. Here, if b=1, $[Rth(\lambda)/Rth(590)]=[\lambda/590]$.

In an embodiment of the present disclosure, when wavelength dispersion of all front phase difference values (Ro) of the retardation layer represents normal wavelength dispersion, then a is an negative integer in Equation 5, and when wavelength dispersion of the negative refractive index values (Nz) of the retardation layer represents flat wavelength dispersion, then c is 0 in Equation 4. In an embodiment of the present disclosure, the wavelength dispersion gradient (a) of the front phase difference value (Ro) of the retardation layer is from about −0.5 to about 0($-0.5 \leq a < 0$), and approximately 0 (flat dispersion). When the wavelength dispersion gradient (a) is approximately 0, the retardation layer 200 has better characteristics.

To effectively control the phase difference of a liquid crystal display device, a and c may respectively satisfy $0 \leq a \leq 2.2$ and $-1.8 \leq c \leq 0$. In a transverse electric field mode liquid crystal display device, the angle between the original point on a Poincare sphere and the point representing the polarizing state of light immediately before passing through the upper polarizing plate may be approximately 0°. However, when c decreases to less than −1.8, Rth is a positive integer at a short wavelength, and is a negative integer at a long wavelength, so that the phase difference of a liquid crystal display device may not be effectively controllable.

Table 1 shows the change of angle according to a and c values.

TABLE 1 changes of inclination angles of RO and NZ

| RO inclination | NZ inclination | | | | | | | | |
|---|---|---|---|---|---|---|---|---|---|
| | 0.0 | −0.2 | −0.4 | −0.6 | −0.8 | −1.0 | −1.2 | −1.4 | −1.6 | −1.8 |
| 0.0 | 36.7854 | 39.036  | 41.6311 | 44.5145 | 47.6375 | 50.9592 | 54.4456 | 58.0692 | 61.8074 | 65.642 |
| 0.2 | 33.3762 | 35.1941 | 37.424  | 40.0013 | 42.8669 | 45.9699 | 49.2682 | 52.7273 | 56.3195 | 60.0226 |
| 0.4 | 30.3341 | 31.5939 | 33.3453 | 35.5193 | 38.0469 | 40.8654 | 43.9212 | 47.1703 | 50.5771 | 54.1133 |
| 0.6 | 27.8602 | 28.4213 | 29.553  | 31.1966 | 33.2791 | 35.7261 | 38.4702 | 41.4539 | 44.6305 | 47.9629 |
| 0.8 | 26.1784 | 25.9124 | 26.2657 | 27.2164 | 28.7076 | 30.662  | 32.9986 | 35.6435 | 38.5337 | 41.6187 |
| 1.0 | 25.4862 | 24.3322 | 23.7714 | 23.847  | 24.5541 | 25.8417 | 27.6292 | 29.8269 | 32.3513 | 35.1317 |
| 1.2 | 25.8785 | 23.8995 | 22.3918 | 21.4551 | 21.1652 | 21.5479 | 22.5684 | 24.1451 | 26.1765 | 28.5646 |
| 1.4 | 27.3013 | 24.6829 | 22.3615 | 20.4377 | 19.0314 | 18.2609 | 18.2053 | 18.8689 | 20.1786 | 22.017 |
| 1.6 | 29.579  | 26.5597 | 23.6858 | 21.0153 | 18.6345 | 16.6654 | 15.2653 | 14.5954 | 14.7519 | 15.7062 |
| 1.8 | 32.4889 | 29.2863 | 26.1366 | 23.0602 | 20.0889 | 17.2746 | 14.7045 | 12.526  | 10.9694 | 10.3143 |
| 2.0 | 35.8207 | 32.6007 | 29.3929 | 26.2009 | 23.03   | 19.8883 | 16.7899 | 15.7608 | 10.8547 | 8.19666 |
| 2.2 | 39.4004 | 36.2807 | 33.1637 | 30.0496 | 26.9389 | 23.832  | 20.7294 | 17.6315 | 14.539  | 11.4525 |

As shown in Table 1, when a and c satisfy one of 0.0≤a≤2.2 and −0.4≤c≤0.0, 0.6≤a≤2.2 and −1.0≤c≤−0.6, 0.6≤a≤2.2 and −1.4≤c≤−1.2, and 0.8≤a≤2.2 and −1.8≤c≤−1.6, the angle can be maintained at about 40°.

When a and c satisfy one of 0.6≤a≤1.6 and −0.4≤c≤0.0, 0.8≤a≤2.2 and −1.0≤c≤−0.6, 1.0≤a≤2.2 and −1.4≤c≤−1.2, and 1.2≤a≤2.2 and −1.8≤c≤−1.6, the angle can be maintained at about 30°.

When a and c satisfy one of 1.2≤a≤1.8 and −1.0≤c≤−0.6, 1.4≤a≤2.2 and −1.4≤c≤−1.2, and 1.6≤a≤2.2 and −1.8≤c≤−1.6, the angle can be maintained at about 20°.

Wavelength dispersion of a liquid crystal display device according to an embodiment of the present disclosure will be described as follows by the change of polarization state on a Poincare sphere.

Figure 7:
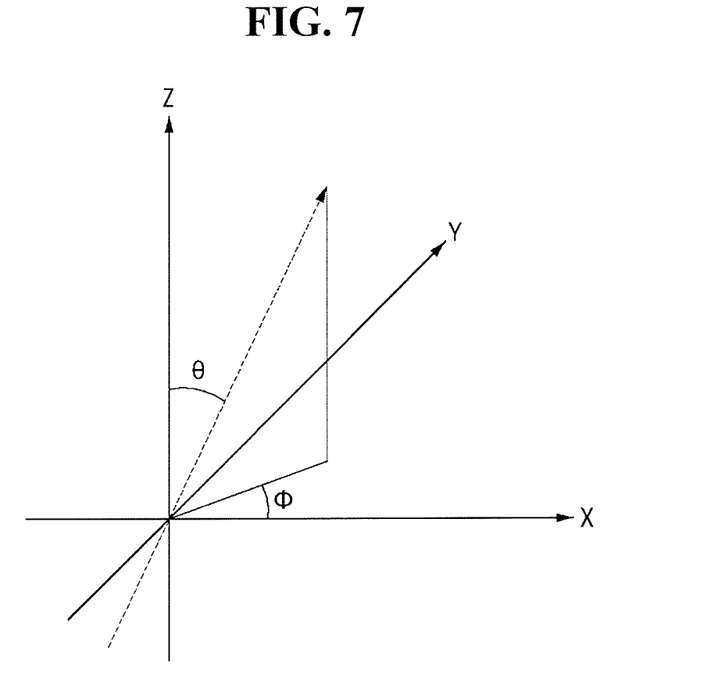
FIG. 7 illustrates a definition of $\theta$ and $\Phi$ in a coordinate system of the present disclosure.

In an embodiment of the present disclosure, the inclination angles for illustrating wavelength dispersion of a liquid crystal display device are represented by θ=60° and Φ=45°, where the Z-axis direction is the front direction of the liquid crystal display device, in the spherical coordinate system shown in FIG. 7. Wavelength dispersion thereof can be ascertained by expressing on a Poincare sphere the change of polarization state of the light emitted in this direction.

When a liquid crystal display device is viewed at an inclination angle of θ=60°, Φ=45°, the polarization state of the liquid crystal display device at wavelengths of 380 nm and 780 nm can be represented by two points on the surface of a Poincare Sphere. The interval between the two points represents the change of polarization state as a function of wavelength. The interval between the two points becomes largest immediately before light passes through the polarizer of the upper polarizing plate 100, thereby deteriorating image quality on the inclined plane.

Specifically, the polarization state of a liquid crystal display device at a wavelength of about 380 nm on a Poincare Sphere can be represented by an x, y, z rectangular coordinate system, and the polarization state thereof at a wavelength of about 780 nm can be represented by an x', y', z' rectangular coordinate system. Since the radius of Poincare Sphere is 1, a distance between two points respectively representing the polarization state of a wavelength of 360 nm and a wavelength of 780 nm is related to an angle between the two points in the coordinate system by Equation 7 below. In this case, the angle between the two points, expressed by Equation 8 below, represents the degree of wavelength dispersion. As light transmits each optical element, this angle increases, and this angle becomes largest immediately before light passes through the polarizer of the upper polarizing plate 100.

$$\frac{\sqrt{(x'-x)^2 + (y'-y)^2(z'-z)^2}}{2} = \sin\frac{\theta}{2},$$ [Equation 7]

$$\theta = 2\sin^{-1}\frac{\sqrt{(x'-x)^2 + (y'-y)^2(z'-z)^2}}{2}.$$ [Equation 8]

The wavelengths of 380 nm and 780 nm correspond to the minimum and maximum values in the visible light region, and most clearly represent dispersion characteristics of a general optical element. Since the angle between two wavelengths in the range of about 380 nm to about 780 nm is less than the angle between the wavelengths of 380 nm and 780 nm, the angle between the wavelengths of 380 nm and 780 nm is the maximum of the angles in the visible light region. Therefore, the optical characteristics of a liquid crystal display device can be clearly presented by the angle between 380 nm and 780 nm.

In an embodiment of the present disclosure, the angle between the wavelengths of 380 nm and 780 nm on a Poincare Sphere may be approximately °0.

Hereinafter, effects of realizing a black state over an entire viewing angle when no voltage is applied to a liquid crystal display device will be summarized in the following Examples and Comparative Examples. An exemplary embodiment of the present disclosure will be described in more detail with reference to the following Examples. However, these Examples are set forth to illustrate the embodiments of present disclosure, and the scope of the embodiments of the present disclosure is not limited thereto.

EXAMPLE

As shown in FIG. 1, a transverse electric field drive mode liquid crystal display device was fabricated by laminating optical films and liquid crystal cells. The lower polarizing plate 400, which is a reflective polarizing plate, has positive C plate phase difference characteristics.

More specifically, as described above, in the lower polarizing plate 400, Ro is approximately 0, and Rth is approximately 80 nm, based on the phase characteristics of transmitted linearly-polarized light.

The retardation layer 200 has positive A plate phase difference characteristics.

More specifically, in the retardation layer, Ro is approximately 54 nm, and Rth is approximately 27 nm.

When compensating for the phase difference of light received by the upper polarizing plate 100 through the retardation layer 200, the degree of compensation of phase difference of the light transmitting the retardation layer 200 may change depending on wavelength. That is, the degree to which the retardation layer retards the phase of short-wavelength light (about 380 nm), medium-wavelength light (about 590 nm) and long-wavelength light (about 790 nm) transmitting the retardation layer may change. Therefore, one retardation layer may be insufficient to compensate for the phase difference of the light received by the upper polarizing plate over the entire wavelength range, and thus a method of compensating for the phase difference of the light using two or more retardation layers, or a method of compensating for the phase difference of the light by compensating and dispersing the light according to wavelength using one retardation layer and then converging the dispersed phase according to wavelength again using the other retardation layer, may be used. Accordingly, in a general liquid crystal device, the phase of the light transmitted to the upper polarizing plate can be compensated using at least two retardation layers disposed beneath the upper polarizing plate.

Figure 8:
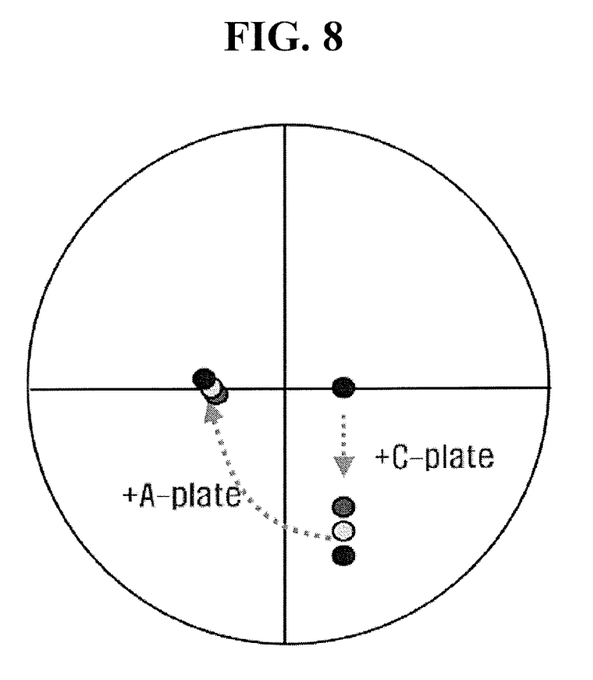
FIG. 8 illustrates phase change characteristics of light passing through a lower polarizing plate and a retardation layer on Poincare sphere in the liquid crystal display according to an embodiment of the present disclosure.

In relation to this, an embodiment of the present disclosure will be described in more detail with reference to FIG. 8. FIG. 8 illustrates phase change characteristics of light passing through the lower polarizing plate 400 and the retardation layer 200 on a Poincare sphere in a liquid crystal display according to an embodiment of the present disclosure.

Referring to FIG. 8, in an embodiment of the present disclosure, the lower polarizing plate 400 may be a reflective polarizing plate having positive C phase difference characteristics. Thus, light having transmitted the lower polarizing plate 400 is converted into light having a positive C phase difference, this light passes through the liquid crystal layer 300 and then the retardation layer 200, which compensates for the phase of the transmitted light, and this compensated light propagates to the upper polarizing plate 100. That is, in an embodiment of the present disclosure, since the lower polarizing plate 400 acts as a positive C retardation layer, the light obtained by converging the dispersed light again according to wavelength may be transmitted to the upper polarizing plate 100 using one positive A phase characteristic retardation layer 200 disposed beneath the upper polarizing plate 100. The lower polarizing plate 400 can act as a positive C plate for white light received from a backlight unit, such as the surface light source 500. In this case, the degree by which the phase difference is shifted according to wavelength on a Poincare Sphere may change, and an observer may perceive different light intensities at a predetermined position according to wavelength, i.e., for red light, green light and blue light. Then, the retardation layer 200 compensates for the phase of the light that has transmitted the liquid crystal layer 300, and the compensated light propagates to the upper polarizing plate 100. In this case, the light dispersed according to wavelength in the lower polarizing plate 400 can be converged.

Figure 5:
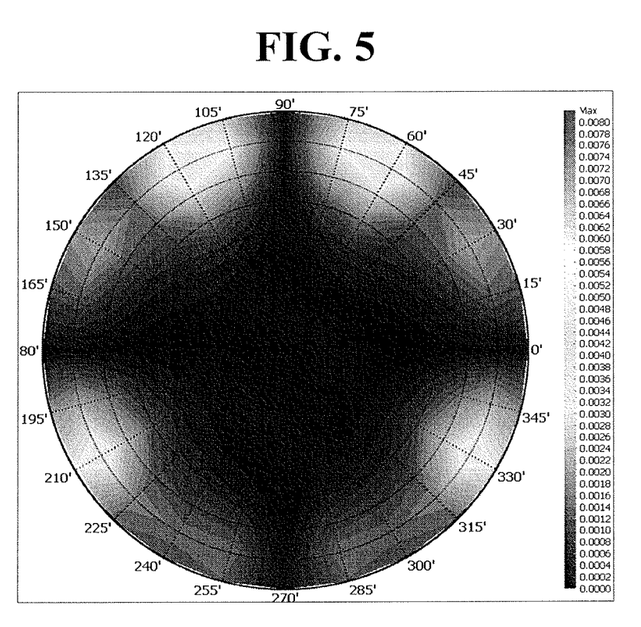
FIG. 5 illustrates an omni-directional luminous transmission distribution when the black state of a traverse electric field drive mode liquid crystal display device according to an embodiment of the present disclosure is displayed on a screen.

FIG. 5 illustrates an omni-directional luminous transmission distribution when the black state is displayed on a screen of a traverse electric field drive mode liquid crystal display device according to an embodiment of the present disclosure.

In this case, on the scale, transmittance has a range of about 0% to about 0.2%. When the central blue range become larger, a viewing angle becomes wider. In the Example, it can be ascertained that the maximum transmittance over the entire range is about 0.03%, and wide viewing angle can be secured when the blue range is large.

Comparative Example

In a Comparative Example, a transverse electric field drive mode liquid crystal display device that uses an absorptive lower polarizing plate, a reflective polarizing plate having positive C phase difference characteristic is illustrated as an example, instead of absorptive polarizing plate.

As described above, since the degree by which a phase difference is compensated according to wavelength in one retardation layer or retardation film may change, the compensation of phase differences according to wavelength is generally performed using at least two retardation layers.

In a Comparative Example, to compensate for the phase difference of the transverse electric field drive mode liquid crystal display device, one negative biaxial retardation film, for which Ro=20 nm and Rth=−88 nm, is provided beneath the upper polarizing plate, and another positive biaxial retardation film, for which Ro=100 nm and Rth=118 nm, is provided beneath the former retardation film.

Figure 6:
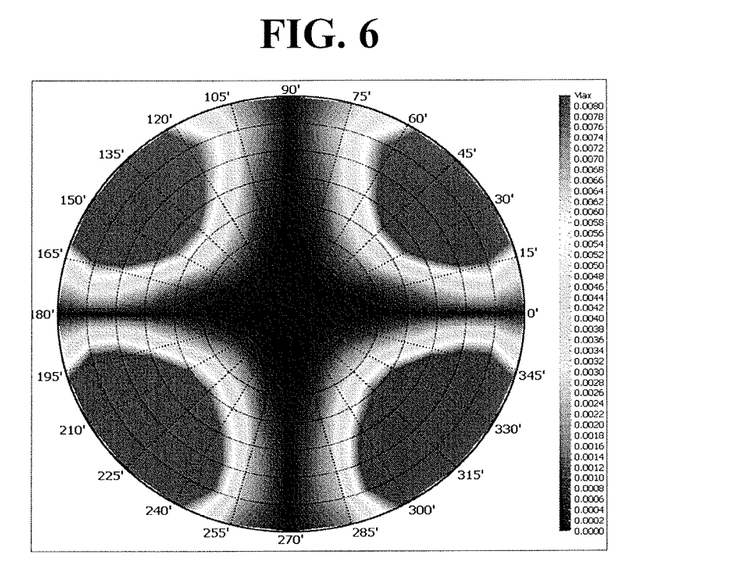
FIG. 6 illustrates an omni-directional luminous transmission distribution when the black state of a Comparative Example is displayed on a screen.

FIG. 6 illustrates an omni-directional luminous transmission distribution when the black state of a Comparative Example is displayed on a screen. From FIG. 6, it can be ascertained that much light leakage occurs on the diagonal inclination because a large number of bright portions are present in a diagonal direction.

According to embodiments of the present disclosure, effects are as follows.

The brightness of a traverse electric field drive mode liquid crystal display device can be enhanced, and the viewing angle thereof can be enlarged.

In concluding the detailed description, those skilled in the art will appreciate that many variations and modifications can be made to the exemplary embodiments without substantially departing from the principles of the embodiments of the present disclosure. Therefore, the disclosed exemplary embodiments of the disclosure are used in a generic and descriptive sense only and not for purposes of limitation.

What is claimed is:

1. A liquid crystal display device, comprising:
a surface light source;
a lower polarizing plate disposed on the surface light source;
a liquid crystal layer disposed on the lower polarizing plate;
a retardation layer disposed on the liquid crystal layer; and
an upper polarizing plate disposed on the retardation layer,
wherein the lower polarizing plate is a reflective polarizing plate exhibiting positive C phase difference characteristics, and the retardation layer exhibits positive A phase difference characteristics,
wherein the lower polarizing plate comprises at least one reflective polarizing laminates and at least one buffer layers,
wherein the reflective polarizing laminate comprises a structure in which first reflective polarizing layers and second reflective polarizing layers are repeatedly laminated, wherein
each first reflective polarizing layer has a first direction refractive index and a different second direction refractive index, and
each second reflective polarizing layer has first direction and second direction refractive indices that are equal to the first direction refractive index of the first reflective polarizing layer, and wherein the at least one buffer layer is disposed, outside the reflective polarizing plate or between two reflective polarizing laminates, and includes a same material as that constituting the second reflective polarizing layer.

2. The liquid crystal display device of claim 1, wherein refractive indices of the lower polarizing plate satisfy Nz>Nx=Ny, wherein Nz is a refractive index in a thickness direction, and Nx and Ny are refractive indices in a direction perpendicular to each other in a plane.

3. The liquid crystal display device of claim 2, wherein the lower polarizing plate has a thickness direction phase difference Rth of 40 nm to 120 nm.

4. The liquid crystal display device of claim 3, wherein the thickness direction phase difference (Rth) of the lower polarizing plate is 80 nm.

5. The liquid crystal display device of claim 1, wherein refractive indices of the retardation layer satisfy Nx>Ny=Nz, wherein Nz is a refractive index in a thickness direction, and Nx and Ny are refractive indices in a direction perpendicular to each other in a plane.

6. The liquid crystal display device of claim 5, wherein the retardation layer has an in-plane phase difference Ro of 20 nm to 160 nm and a thickness direction phase difference Rth of 10 nm to 80 nm.

7. The liquid crystal display device of claim 6, wherein the in-plane phase difference Ro of the retardation layer is 54 nm, and the thickness direction phase difference Rth of the retardation layer is 27 nm.

8. The liquid crystal display device of claim 1, wherein the liquid crystal layer includes two substrates facing each other and a liquid crystal material interposed between the two substrates, and molecules of the liquid crystal material are aligned parallel to the two substrates.

9. A liquid crystal display device, comprising:
a lower polarizing plate that received light;
a retardation layer disposed on lower polarizing plate; and
an upper polarizing plate disposed on the retardation layer,
wherein the lower polarizing plate comprises at least one reflective polarizing laminate and at least one buffer layer, and
wherein the lower polarizing plate is a reflective polarizing plate exhibiting positive C phase difference characteristics, and the retardation layer exhibits positive A phase difference characteristics,
wherein the reflective polarizing laminate comprises a structure in which first reflective polarizing layers and second reflective polarizing layers are repeatedly laminated, wherein each first reflective polarizing layer has a first direction refractive index and a different second direction refractive index, and each second reflective polarizing layer has first direction and second direction refractive indices that are equal to the first direction refractive index of the first reflective polarizing layer, and wherein the at least one buffer layer is disposed outside the reflective polarizing plate or between two reflective polarizing laminates, and includes a same material as that constituting the second reflective polarizing layer.

10. The liquid crystal display device of claim 9, wherein refractive indices of the lower polarizing plate satisfy Nz>Nx=Ny, wherein Nz is a refractive index in a thickness direction, and Nx and Ny are refractive indices in a direction perpendicular to each other in a plane.

11. The liquid crystal display device of claim 10, wherein the lower polarizing plate has a thickness direction phase difference Rth of 40 nm to 120 nm.

12. The liquid crystal display device of claim 11, wherein the thickness direction phase difference (Rth) of the lower polarizing plate is 80 nm.

13. The liquid crystal display device of claim 9, wherein refractive indices of the retardation layer satisfy Nx>Ny=Nz, wherein Nz is a refractive index in a thickness direction, and Nx and Ny are refractive indices in a direction perpendicular to each other in a plane.

14. The liquid crystal display device of claim 13, wherein the retardation layer has an in-plane phase difference Ro of 20 nm to 160 nm and a thickness direction phase difference Rth of 10 nm to 80 nm.

15. The liquid crystal display device of claim 14, wherein the in-plane phase difference Ro of the retardation layer is 54 nm, and the thickness direction phase difference Rth of the retardation layer is 27 nm.

16. The liquid crystal display device of claim 9, further comprising:
a surface light source under the lower polarizing plate that provides light to the lower polarizing plate; and
a liquid crystal layer interposed between the lower polarizing plate and the retardation layer,
wherein the liquid crystal layer includes two substrates facing each other and a liquid crystal material interposed between the two substrates, and molecules of the liquid crystal material are aligned parallel to the two substrates.

17. The liquid crystal display device of claim 9, further comprising: a protective layer disposed on the upper polarizing plate.

* * * * *